United States Patent [19]

Güttinger

[11] 4,296,341
[45] Oct. 20, 1981

[54] SELF-STARTING SINGLE-PHASE SYNCHRONOUS MOTOR

[75] Inventor: Kurt Güttinger, Murten, Switzerland

[73] Assignee: Sodeco-SAIA SA, Geneva, Switzerland

[21] Appl. No.: 919,737

[22] Filed: Jun. 27, 1978

[30] Foreign Application Priority Data

Jul. 15, 1977 [CH] Switzerland ............ 8763/77

[51] Int. Cl.³ .................................... H02K 7/10
[52] U.S. Cl. ........................... 310/41; 310/156; 310/266
[58] Field of Search ............. 310/41, 74, 162–164, 310/67, 266, 156, 153, 84

[56] References Cited

U.S. PATENT DOCUMENTS

| | | | |
|---|---|---|---|
| 2,622,215 | 12/1952 | Piekarski | 310/84 |
| 2,714,673 | 8/1955 | Buchmann | 310/84 |
| 2,774,895 | 12/1956 | Zuckermann | 310/266 |
| 2,928,963 | 3/1960 | Bertsche | 310/266 |
| 3,049,635 | 8/1962 | Hirderer | 310/84 |
| 3,354,993 | 11/1967 | van der Lely | 310/41 |
| 3,501,657 | 3/1970 | Heinzen | 310/41 |
| 3,525,888 | 8/1970 | Linn | 310/41 |
| 3,549,423 | 12/1970 | Kurakin | 310/266 |
| 3,751,695 | 8/1973 | Morley | 310/41 |
| 4,087,713 | 5/1978 | Binder | 310/266 |
| 4,166,225 | 8/1979 | Estkowski | 310/41 |

Primary Examiner—R. Skudy
Attorney, Agent, or Firm—Wender, Murase & White

[57] ABSTRACT

A self-starting single-phase synchronous motor comprising a generally bell-shaped permanently magnetized rotor, a coil located inside the rotor and having a core which is connected at both ends to stator parts having distinct poles, one of the stator parts being located between the coil and rotor and the other stator part being located outside the rotor, the rotor being rotatably mounted on the shaft with defined friction, a resilient coupling element arranged between the rotor and shaft, and locking means acting on the rotor for determining the starting direction of rotation and located in front of the resilient coupling element on the power transmission path.

10 Claims, 3 Drawing Figures

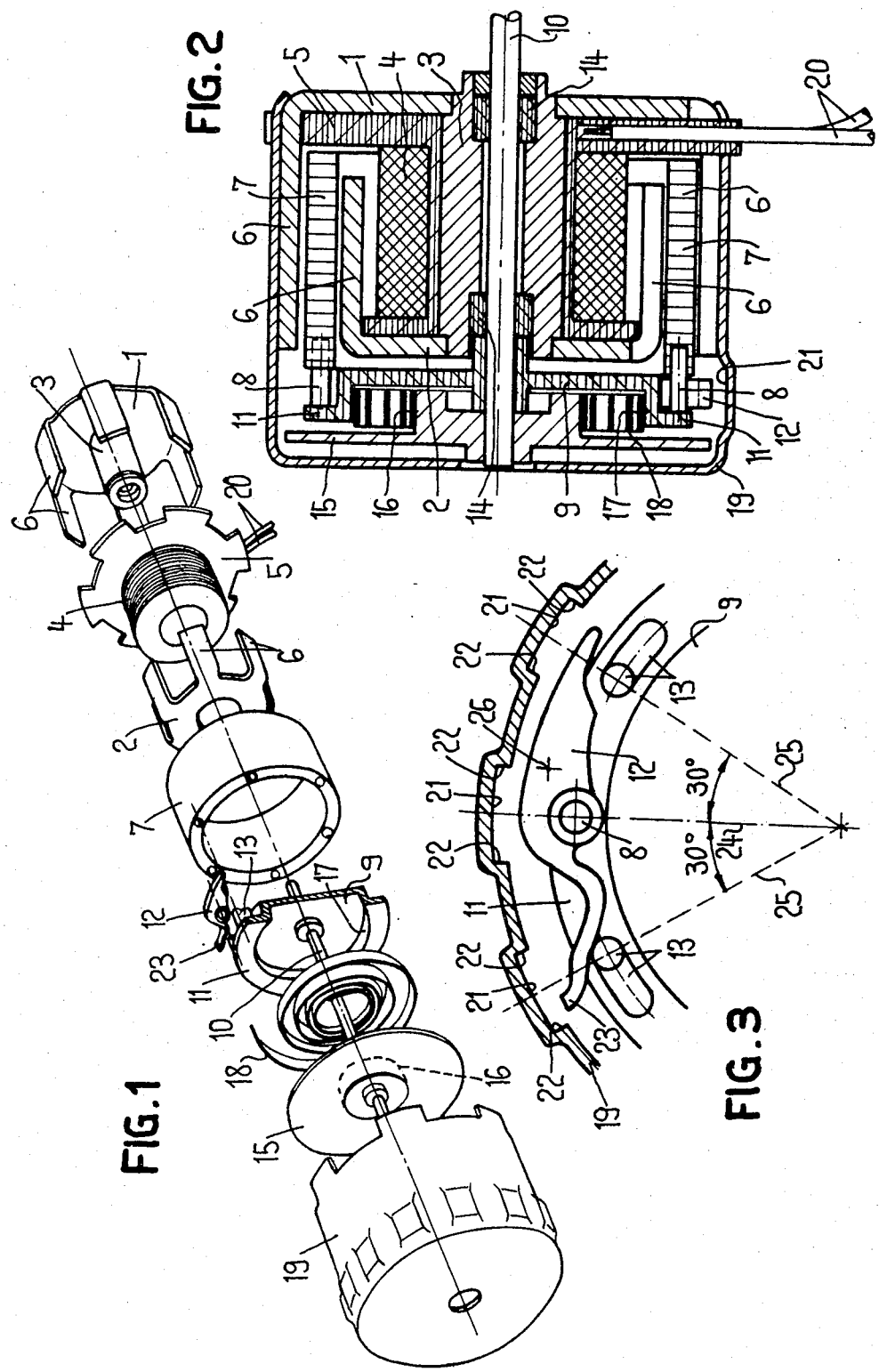

SELF-STARTING SINGLE-PHASE SYNCHRONOUS MOTOR

BACKGROUND OF THE INVENTION

The present invention relates to a self-starting single-phase synchronous motor, more especially a miniature motor, having a coil located inside a permanently magnetized bell-shaped rotor, the core of the coil being connected on both sides with stator components one of which is located between the and rotor, and the other being located outside the rotor.

Such a motor is known, e.g. from the German Offenlegungsschrift No. 2,254,897, and even though this motor has the advantage of the length of winding in the internally located coil being small and therefore the requirement in copper and the copper losses being accordingly low, the motor is not very efficient nor does it have a particularly high performance because distinct poles are provided only inside the rotor. It has also been found that this known motor, in which the rotor is securely mounted on the shaft, has no favorable starting characteristics.

It is an object of the present invention to provide a self-starting single-phase synchronous motor which has a high degree of efficiency and a high specific output and optimum starting characteristics under all conceivable load conditions.

SUMMARY OF THE INVENTION

According to the present invention there is provided a self-starting single-phase synchronous motor comprising a generally bell-shaped permanently magnetized rotor, a coil located inside the rotor and having a core which is connected at both ends to stator parts having distinct poles, one of which stator parts is located between the coil and rotor, and the other stator part is located outside the rotor, said rotor being rotatably mounted on the shaft with defined friction. A resilient coupling element is arranged between the rotor and shaft, and looking means acting on the rotor for determining the starting direction of rotation is located in front of the resilient coupling element on the power transmission path.

Since both stator parts have distinct poles, optimal use of the flux or the permanently magnetic rotor is possible. The leakage flux is very low because only identically polarized stator poles are provided within and outside the rotor, which is also decisive for the efficiency of the motor. It is possible to attain with cheap material a very high degree of efficiency both for the stator and for the rotor, which may, for example, be up to 50 percent in a motor with a power input of 1.4 W. Known asynchronous motors in this performance class attain efficiencies up to a maximum of about 15 percent. Accordingly, higher efficiencies, specific performances and torques may be attained when using optimum, but accordingly more costly, materials.

The fact that the rotor is rotatably mounted on the shaft and is connected therewith by a resilient coupling element, preferably a coil spring, and that the locking means for determining the starting direction acts directly on the rotor, thus on the power transmission path in front of the coupling element, is decisive for the very special starting characteristics, apart from the high starting torque resulting from the optimal use of the flux and the permanent magnets. It is possible for the motor under load to be started reliably and in the required direction by a high breaking torque and/or a high inertia moment of the driven device. The resilient coupling between the rotor and the motor shaft permits the rotor to start independently of the load and to be accelerated very quickly to the practical synchronous speed. The coupling element is tensioned thereby and begins to accelerate the load. If the pull-out torque of the rotor is attained before the load has been completely accelerated, the rotor stops briefly or starts in an opposite direction, which, however, is immediately prevented by the locking means. The rotor then again receives the full driving impulse in the required direction of rotation. In this manner, due to its resilient coupling to the motor shaft or the load will under circumstances reciprocate, whereby due to its resilient reflection by means of the pawl or pawls it may amplify its movement energy until it continues to rotate in the required direction of rotation. In this manner it is possible to accelerate any load into the required direction of rotation until only the breaking moment of the load is less than the rotational torque of the rotor. The motor starts reliably even in the event of the adjustment moments acting on the motor, when stationary, in the required or undesired direction of rotation.

It is, moreover, essential to ensure that the motor always stops in a stop location in which, when connected to the mains, it receives a starting torque which is greater than the friction moment between rotor and shaft. It has been found that these conditions may be fulfilled if the stator poles have a width of from 100 to 180 electric degrees.

To obtain stable conditions it is further favorable for the resonance frequency of the system comprised of the rotor and the resilient coupling element, and also the resonance frequency of the free system comprised of shaft, the rotor and the resilient coupling element, to be kept less than the mains frequency or the operating frequency. For this purpose, it may be necessary to arrange a separate inertia mass, such as a flywheel, on the shaft.

The mounting of locking means, such as pawls, on the rotor provides a special advantage which has independent significance in that the locking means during the rotation of the motor remain disengaged under the action of centrifugal force, and are thus unable to cause friction or noises, and with high acceleration, such as during start, may be engaged by acceleration forces.

The invention will be described further, by way of example, with reference to the accompanying drawings.

BRIEF DESCRIPTION OF THE DRAWINGS

FIG. 1 is an exploded perspective view of a self-starting single-phase synchronous motor in accordance with the present invention;

FIG. 2 is an axial section through the motor; and

FIG. 3 is a fragmentary section of the motor on an enlarged scale.

DESCRIPTION OF THE PREFERRED EMBODIMENT

A motor is shown in the drawings having stator parts 1 and 2 of ferro-magnetic type which are connected by a force fit or by riveting to the opposite ends of a stator core 3 of soft iron. A coil 4 is mounted on the core 3 and has a toothed flange 5 on the body thereof. The teeth of the flange 5 engage in the gaps between stator poles 6 of the stator part 1 and prevent the coil from rotating. It would also be possible to allow the teeth of the flange 5 to project into gaps between the poles of both stator parts 1 and 2, and hence to determine the mutual position of these poles on assembly. Each two poles of the two stator parts register with one another, i.e. they assume the same angular position on the circumference of the motor. The stator parts are each six-poled, and the poles have a width of from 100 to 180 electric degrees.

A permanently magnetisd annular part 7 of the rotor engages between the two stator parts and has six axial bores formed therein, and into each of which a retaining pin 8 engages. The retaining pins 8 are secured to a plate 9 which is rotatably mounted on rotary motor shaft 10 and the rotor is hence rotatably mounted on the shaft. The pins 8 are so mounted in a flange 11 of the plate 9 that a gap remains between the flange 11 and the magnetised ring 7 of the rotor, and pawls 12 are mounted in this gap. Three pawls are usually mounted in order on the one hand to attain a balanced construction and, also, to increase reliability of the pawls engaging each time. Stop cams 13 for the pawls are also located on the flange 11 between the actual securing pins 8 on which also the pawls 12 are mounted (see FIG. 3).

The ring of the rotor is radially magnetised such that twelve radial magnets are formed on its circumference which alternately have opposing polarity.

Shaft 10 is mounted in a bore of the core by means of bearings 14, and the shaft supports a flywheel 15 acting as inertia mass and whose boss forms a sholder 16. A coil spring 18 is located between the shoulder 16 and an internal shoulder 17 of the plate 9, which with its inherent spring force abuts against these shoulders and is coupled by friction with the parts 15 and 9. The spring hence forms a resilient element which couples the rotor 7, 9 with the shaft 10, and provides a friction clutch which is caused to slip when a cetain torque acting between the shaft and rotor is exceeded.

A deep drawn housing 19 is mounted on the stator part 1 and is provided with gaps to receive the teeth of the flange 5. Connecting leads 20 are embedded in the flange 5 and pass through one of the gaps of the housing. As is especially shown in FIG. 3, a ratchet gear formation co-operating with the pawls 12 is embossed in the housing 19. The indentations 21 of this ratchet have stop flanks 22 on both sides, which are intended to co-operate with a firing notch or stop projection 23 of a pawl 12. FIG. 3 shows the position of the pawl 12 for a stable rest position of the rotor, which is characterized by the radius 24. The indentations 21 are located symmetrically to radii 25 which are offset relative to the radius 24 through 30 degrees or n×30 degrees. The extremity of the stop projection 23 of the pawl 12 is thus offset somewhat in circumferential direction relative to its adjacent stop flank 22, such that the pawl immediately engages with the stop shoulder when the rotor tends to start up in the undesired direction of rotation, namely in an anti-clockwise direction. Since the catch toothing on the stator housing is symmetrically located with respect to the pins 8 in the given stable rest positions of the rotor, the pawls 12 may be mounted optionally in one or the other position so as to determine the desired direction of rotation.

As stated, the stable rest positions of the rotor are very clearly determined by the width of pole between 100 and 180 electric degrees and the radial magnetisation of the rotor ring 7, namely in such a manner that the permanently magnetized poles of the rotor are located symmetrically between the stator poles. It is substantially impossible for the rotor to stop in an unstable position in which the poles of the rotor are located below the stator poles. The rotor hence always stops in a position in which an adequate starting torque acts on the rotor when switching the stator coil. This torque, however, acts in an optional and not predeterminable direction. If the rotor starts in an undesired direction of rotation, then at least one of the pawls 12 immediately engages in the ratchet toothing. The center of gravity 26 of the pawls 12, as shown in FIG. 3, lies outside the bearing pin 8 and opposite the stop projection 23. If the motor is now suddenly accelerated from the rest position in FIG. 3 in an anti-clocking direction, the pawl 12 has a torque acting thereon in a clockwise direction due to its center of gravity, and its stop projection moves into the gap 21 of the ratchet toothing opposite thereto, so that when the stop projection 23 strikes against the stop flank 22, the rotor is reversed into the required direction of rotation and starts up therein. As described above, the spring 18 located between rotor and shaft permits an immediate start of the rotor with synchronous speed; thus, even if the shaft and the load connected therewith cannot immediately accelerate therewith, the motor may start synchronous operation. If, on the other hand, the load given by the frictional resistance and the inertia surpasses the torque of the rotor, the rotor stops. With the next half wave of the alternating current it rotates in the opposite direction, but is immediately locked and reversed. If the load torque is still excessive, the rotor can reciprocate several times in this manner, whereby due to resilient reflection of the rotor during engagement of the pawls, energy builds up until the rotor is able to continue rotating synchronously. These operations may be repeated until the load has been accelerated to the synchronous speed. Therefore, it possible to accelerate loads having a considerable inertia torque if the motor is only able to overcome the frictional moment.

If the rotor has been accelerated to synchronous speed and rotates only with a standing wave ratio which is caused by the pulsating driving torque acting on the rotor, substantially only the centrifugal force acts on the pawls 12, i.e. due to the position of their center of gravity a torque in an anticlockwise direction acts on the pawls, so that the pawls are retained in the disengaged position of FIG. 3. The locking device during normal rotation thus produces no friction or noise whatsoever.

In order to obtain stable ratios in all cases, certain conditions which have already been referred to have to be fulfilled. It may be necessary to mount a flywheel on the shaft whereby the masses and the spring constant of the spring 18 are to be chosen such that the rotor with the spring, with a blocked shaft and also the system comprised of rotor, spring and shaft, has an inherent frequency below the mains frequency or operating frequency of the motor. For obtaining stable conditions, the friction between rotor and shaft acting dampingly is also essential. The friction torque between rotor and shaft should, of course, also be less than the maximum torque acting from the stator onto the rotor, since otherwise the spring 18 would be useless.

I claim:

1. A self-starting single-phase synchronous motor comprising:

a generally bell-shaped permanently magnetized rotor;

a stator having two parts each with distinct poles;

a coil located inwardly of the rotor and having a core which is connected at its end to said two stator parts, one said stator part being located between said coil and rotor and the other said stator part being located outwardly of said rotor, said rotor being rotatably mounted on a shaft with defined friction;

a resilient coupling element interposed between said rotor and shaft, said resilient coupling element engaging said rotor and shaft for resiliently transmitting torque from said rotor to said shaft; and locking means mounted on said rotor and acting on said rotor for locking said rotor preventing rotation in an undesired direction and for permitting starting of said rotor in the opposite, desired direction of rotation, said locking means located in front of said resilient coupling element on the power transmission path.

2. A motor according to claim 1, wherein the width of the distinct stator poles is from 100 to 180 electric degrees.

3. A motor according to claim 1 or 2, wherein the resonance frequency of the system comprised of said rotor and said resilient coupling element with the shaft blocked is less than the mains frequency.

4. A motor as claimed in claim 3, in which the resonance frequency of the free system comprised of said shaft, rotor and the resilient coupling element is also less than the mains frequency.

5. A motor according to claim 1, further comprising ratchet toothing means mounted on said stator; and wherein said locking means to determine the starting direction of rotation comprise pawls mounted to be freely pivotal on said rotor; the center of gravity of said pawls lying outside and, with regard to the undesired direction of rotation, being located behind the pivotal axis, such that the pawls during sudden acceleration are pivotally engaged with said ratchet toothing means when the rotor starts in the undesired direction of rotation and are pivotally disengaged on continued rotation of the rotor in the opposite, desired direction.

6. A motor according to claim 5, wherein said rotor has pivot means allowing pivotal mounting of said pawls on said rotor in one of two opposite positions, the direction of rotation during starting being determined in accordance with the position of the pawls.

7. A motor according to claim 5 or 6, wherein the stop positions of the pawls are located close to the positions of said rotor at which maximum starting torque acts thereon.

8. A motor according to claim 5, wherein said ratchet toothing means comprises a motor housing having indentations therein mounted on said stator.

9. A motor according to claim 7, wherein said ratchet toothing means has a number of teeth defining as many locking positions as there are rest positions of said rotor or as there are positions with maximum starting torque.

10. A motor according to claim 1 or 5, wherein an inertia mass is mounted on said motor shaft for increasing the moment of inertia of said shaft.

* * * * *